Feb. 16, 1932.  E. M. CLAYTOR  1,845,481
CONTROL SYSTEM
Filed April 16, 1928
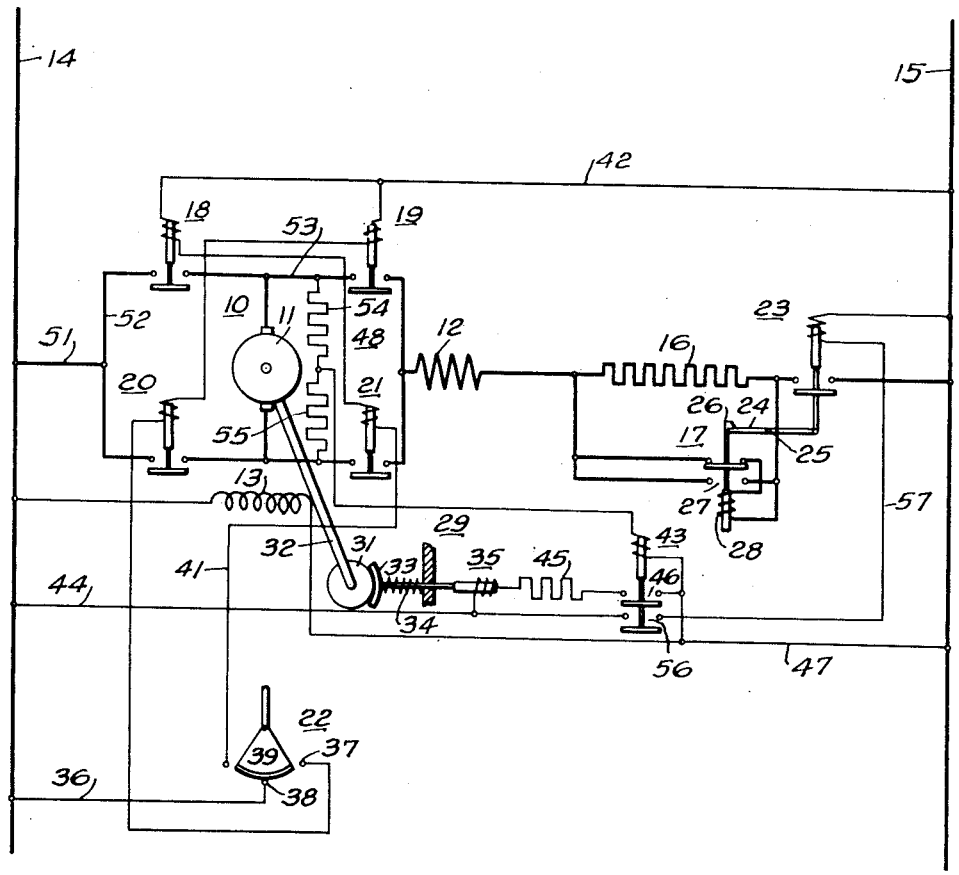
INVENTOR
Edward M. Claytor.
BY
Wesley L. Carr
ATTORNEY Patented Feb. 16, 1932

1,845,481

UNITED STATES PATENT OFFICE

EDWARD M. CLAYTOR, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed April 16, 1928. Serial No. 270,191.

This invention relates generally to motor-control systems and more particularly to systems for controlling the operation of electric motors which are provided with electro-magnetically-controlled braking mechanisms.

There are many motor applications which require the use of a brake to prevent the motor from being rotated by the momentum of the rotating parts after the interruption of the motor circuit. Electro-magnetic brakes for motors are usually constructed in such manner that the brake shoe is drawn to an inactive position when the magnet is energized and projected to an active position by a spring when the magnet is deenergized and, generally, provision is made for energizing the magnet and motor simultaneously.

The usual practice, in operating an electro-magnetic brake, is to control the energizing circuit for the electro-magnet by interlocks on the reversing switches which are utilized for controlling the direction of rotation of the motor. However, in some instances, it is very desirable to provide for releasing the brake before the motor is energized, in order to avoid any possibility of connecting the motor to the line before the brake has been released and thereby impose upon the brake an excessive amount of wear, and incidentally cause the motor to draw an excessively high starting current from the supply source.

In order to obtain accurate and reliable operation of a certain type of control system, it is desirable to provide the system with a minimum number of switch interlocks.

The object of my invention, generally stated, is to provide a control system for controlling the operation of electric motors and electro-magnetically operated motor brakes which shall be simple and efficient in operation and readily and economically manufactured and installed.

A more specific object of the invention is to provide for controlling the operation of an electro-magnetically operated motor brake to insure the release of the brake before the motor is energized from the power source.

A further object of the invention is to provide for rendering the connection of the motor to the power source dependent upon the operation of the electro-magnetic brake.

Another object of the invention is to provide for rendering the operation of an electro-magnetic brake dependent upon the connection of the motor to turn in a predetermined direction.

Other objects of the invention will become evident from the following description, taken in conjunction with the accompanying drawing, in which the single figure is a diagrammatic view of a motor-control system embodying the invention.

Referring now to the drawing, 10 designates, generally, a motor which may be utilized for driving a load. In this particular instance, a direct-current motor 10 is shown, having an armature 11, series field winding 12 and a shunt field winding 13.

The motor may be energized from any suitable source of direct-current power which, in this instance, is illustrated as line conductors 14 and 15. In the interest of simplicity in the drawing, the shunt field winding 13 is shown connected directly across the source of power, but it will be understood that suitable means well known in the art may be employed for controlling the exciting current that may flow in the field winding.

In order to provide for limiting the motor current during the starting and accelerating periods, a resistor 16 is utilized. The functioning of the resistor 16 is controlled by a current-responsive relay 17 which is disposed to be operated in response to a pre-determined current flowing in the motor circuit. As will be observed, when the relay 17 is actuated to close its contact members, the resistor is shunted.

Since the scheme of accelerating the motor is not an important part of this invention, it is deemed sufficient to show a one-step accelerating system, although it is to be understood that a series of switches, similar to the switch 17, may be readily employed.

The direction of rotation of the motor 10, in this instance, is controlled by a plurality of directional switches 18 to 21, inclusive, which are disposed to be electrically controlled by means of a manually operated master switch 22 having forward and reverse operating positions, as shown. The main motor circuit is controlled by a single line switch 23, which, as shown, is mechanically interlocked with the accelerating switch 17, so that, when the switch 23 is in its open position, the switch 17 will be positively maintained in its raised position and the shunt for the starting resistor 16 interrupted, thereby providing the proper resistance in the motor circuit.

Since the operation of line switches in connection with accelerating switches of this character is well understood, it is deemed sufficient to state that, as the line switch 23 is actuated to its closed position, the interlocking lever 24, which is pivoted at 25, disengages the armature member 26 of the switch 17. Upon the release of the armature 26, the switch 17 tends to drop to its lowermost position and bridge the contact members 27 but it may be prevented from doing so by the coil 28, if the latter is energized.

As shown, the current coil 28 is connected across the resistor 16, and, being of much lower resistance, substantially all of the motor current flows through it. When the motor is being started, it takes a heavy current, the greater portion of which flows in the coil 28 and develops sufficient magnetic force to maintain the armature member 26 in its uppermost position. When the motor current drops to a pre-determined value, the magnetic force of the coil 28 becomes insufficient to support the armature 26 which drops and bridges the contact members 27.

In this particular embodiment of the invention, the motor 10 is provided with a brake 29. As shown, the brake drum 31 is connected directly to the armature 11 by means of the shaft 32, which, as will be readily understood, may also be mounted directly on the motor shaft. A brake of any suitable type adapted for electro-magnetic control may be utilized. The brake 29, is of a well known type comprising a brake shoe 33 biased into engagement with the brake drum 31 by a suitable coil spring 34 and disposed to be released by an electro-magnet 35.

In order to more clearly describe the operation of the brake 29, in connection with the operation of the motor 10, the operation of the system will be described in detail. The master switch 22 may be actuated to either the "forward" or the "reverse" position to energize the motor 10 for operation in either direction. Assuming that the master switch 22 is actuated to the "forward" position, an operating circuit for the directional switches 21 and 18 is established. This circuit may be traced from the line conductor 14, through conductor 36, contact members 37 and 38, bridged by the movable segment 39 of the switch 22, conductor 41, operating coils of the switches 21 and 18 and conductor 42 to the line conductor 15.

Since, as set forth in the beginning of the specification, it is desirable to retain the line switch 23 in its open position until the brake 29 is released, the operations of the two are so interlocked as to prevent the closure of the line switch 23 until the actuating electromagnet of the brake 22 is energized.

In order to render the operation of the brake 29 dependent upon the closure of the directional switches 21 and 18, means are provided for controlling the energization of the electro-magnet 35 in response to the operation of the directional switches without the use of interlocks or auxiliary switches. The energization of the electro-magnet 35 is controlled by a double-pole switch or relay 43, which when operated, establishes a brake-actuating circuit which extends from the line conductor 14 to conductor 44, operating coil of the electro-magnet 35, resistor 45, contact members 46 of the relay 43 and conductor 47 to the line conductor 15.

In order to energize the operating coil of the relay 43, a resistor 48 is provided and connected in shunt relation to the armature 11 of the motor 10. It will be readily understood that, when either pair of directional switches 18 and 21, or 19 and 20 are operated, one terminal of the resistor 48 will be connected to the line conductor 14. As shown, the operating coil of the relay 43 is connected to the mid-point of the resistor 48, which, in this case, with the directional switch 18 in the closed position, establishes an energizing circuit for operating the relay 43 which extends from the line conductor 14, conductors 51 and 52, switch 18, conductor 53, the section 54 of the resistor 48, operating coil of the relay coil 43, and conductor 47 to the line conductor 15. If the directional switch 20 is closed, the actuating circuit for the brake control relay 43 extends through the section 55 of the resistor 48, the actuating coil of the relay 43 and conductor 47, to the line conductor 15.

Therefore, upon the closure of the relay 43, the electro-magnet 35 is energized and the brake 29 released. It will be observed that the relay 43 is provided with an auxiliary contact member 56, which, when closed, establishes a circuit extending from the line conductor 14 through conductor 44, contact members 56, conductor 57 and the operating coil of the line switch 23, to the line conductor 15. Therefore, upon the establishment of the brake-actuating circuit, the relay 43 is operated and an actuating circuit for the line switch 23 is established. However, the main circuit of the motor 10 is maintained open until the brake 29 has been released.

As described hereinbefore, the operation of the line switch 23 permits the accelerating switch 17 to close after the motor current is reduced to a pre-determined minimum value, thereby accelerating the motor to full speed.

It will be observed that, after the motor circuit has been completed by the closure of the line switch 23, the resistor 48 will be in parallel-circuit relation to the armature 11 of the motor 10, and, in order to prevent the flow of an excessive amount of current through the resistor, its resistance value must be comparatively high. By utilizing a resistor having sufficient resistance to produce a voltage drop equal to the voltage of the supply source, and an operating coil on the relay 43 of one-half the voltage rating of the supply source, the required value of operating voltage for the relay 43 may be obtained when either pair of the directional switches is in closed position, since one-half of the voltage drop across the resistor 48 plus the voltage drop of the operating coil of the relay 43 is equal to full line voltage.

It may be stated, in conclusion, that, while the illustrated example constitutes a practical embodiment of my invention, I do not wish to limit myself strictly to the exact details herein illustrated, since modifications of the same may be made without departing from the spirit of the invention as defined in the appended claims.

I claim as my invention:

1. In a motor-control system, in combination, a motor, a circuit for energizing the motor, a line-switch for controlling the motor circuit, directional switches for controlling the direction of operation of the motor, a brake for the motor, electro-magnetic means for operating the brake, means for energizing the electro-magnetic brake-actuating means comprising a resistor connected in shunt relation to the motor armature, a relay having an operating coil connected between the mid-point of the resistor and the motor-energizing circuit to permit the flow of energizing current for the relay in response to the closure of the directional switches, and means controlled by the relay for actuating the line switch.

2. In a motor-control system, in combination, a motor, a circuit for energizing the motor, a line-switch for controlling the motor circuit, directional switches for controlling the direction of operation of the motor, a brake for the motor, electro-magnetic means for operating the brake, means for energizing the electro-magnetic brake-actuating means comprising a resistor connected in shunt relation to the motor armature, a relay having an operating coil connected between the mid-point of the resistor and the motor-energizing circuit to permit the flow of energizing current for the relay in response to the closure of the directional switches, and an auxiliary circuit-controlling member actuated by the relay for energizing the line switch.

3. In a motor-control system, in combination, a motor, a circuit for energizing the motor, a line switch for controlling the motor circuit, directional switches for controlling the direction of operation of the motor, a brake for the motor, an electro-magnet for operating the brake, a relay disposed to control the energization of the electro-magnet for operating the brake, and means for effecting the operation of the relay, said means being permanently connected in shunt relation to the motor.

4. In a motor-control system, in combination, a motor, a source of power for the motor, a plurality of switches for connecting the motor to the power source, a controller for effecting the operation of certain of said switches to connect only one motor terminal to the power source, a brake for the motor, electro-magnetic means for operating the brake, brake-control means responsive to the closure of said switches for energizing the brake-operating means, and means controlled by the operation of the brake-control means for effecting the operation of the other switches to completely connect the motor to the power source.

5. In a motor-control system, in combination, a power source, a motor, a plurality of switches for connecting the motor to the power source, a controller for effecting the operation of predetermined switches to partially connect the motor to the power source, an electro-magnetic brake for the motor, brake-control means responsive to the closure of said pre-determined switches for effecting the energization of the brake, and means responsive to the operation of the brake-control means for effecting a final connection of the motor to the power source, thereby to prevent the complete energization of the motor before the brake becomes energized.

6. In a motor-control system, in combination, a motor, a circuit for energizing the motor, a line contactor for controlling the motor circuit, an electro-magnetically releasable brake for the motor, a relay for controlling the operation of the line contactor and the brake, directional contactors for controlling the operation of the relay and a manual controller for controlling the operation of the directional contactors.

7. In a motor-control system, in combination, a motor, directional contactors, a circuit for energizing the motor, a line contactor, a brake for the motor, operating means for the line contactor and electro-magnetic means for releasing the brake, and a control relay responsive to the operation of the directional contactors for simultaneously establishing energizing circuits for the line-contactor operating means and the brake-releasing means.

In testimony whereof, I have hereunto subscribed my name this 11th day of April, 1928.

EDWARD M. CLAYTOR.